No. 738,653. PATENTED SEPT. 8, 1903.
O. L. BRAINARD.
TOOL TURRET FOR LATHES.
APPLICATION FILED JAN. 20, 1903.
NO MODEL.
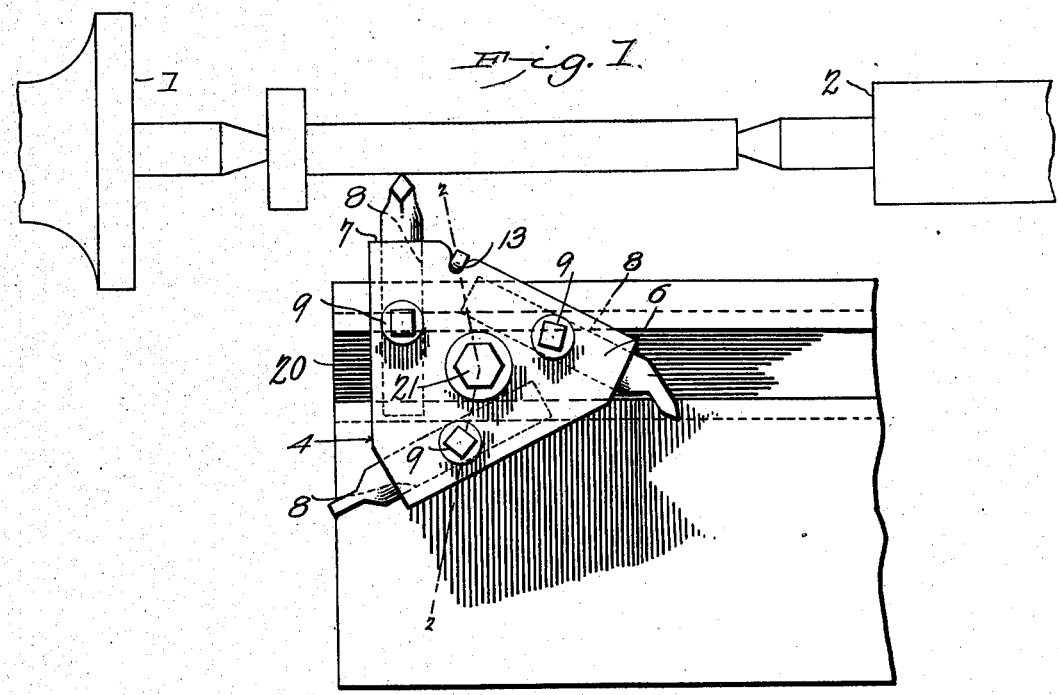
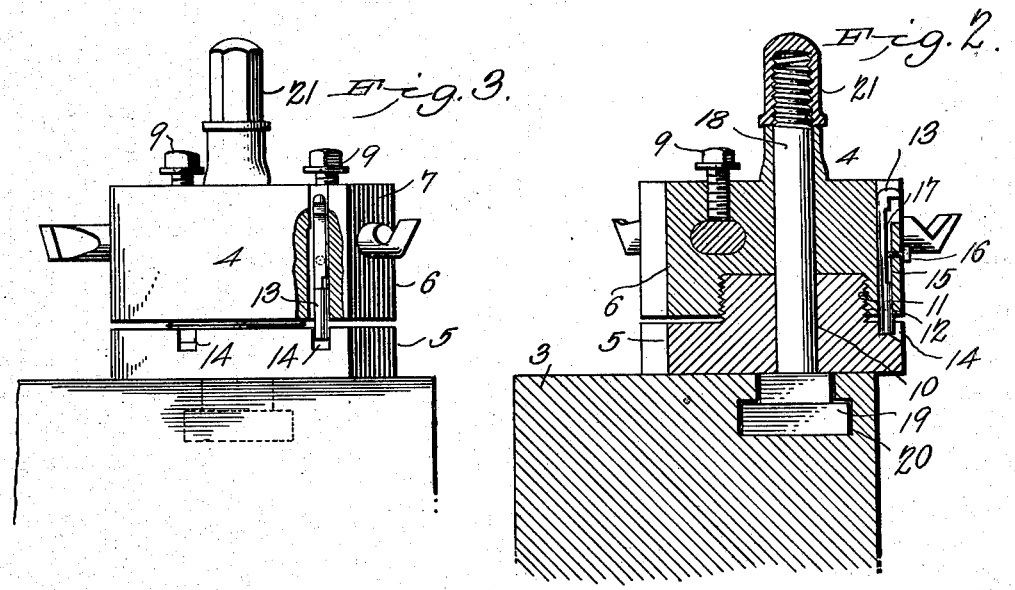
Witnesses
O. L. Brainard, Inventor:
by C. A. Snow & Co.
Attorneys No. 738,653. Patented September 8, 1903.

UNITED STATES PATENT OFFICE.

OMAR LOYAL BRAINARD, OF VERDI, NEVADA.

TOOL-TURRET FOR LATHES.

SPECIFICATION forming part of Letters Patent No. 738,653, dated September 8, 1903.

Application filed January 20, 1903. Serial No. 139,784. (No model.)

*To all whom it may concern:*

Be it known that I, OMAR LOYAL BRAINARD, a citizen of the United States, residing at Verdi, in the county of Washoe and State of Nevada, have invented a new and useful Tool-Turret for Lathes, of which the following is a specification.

My invention relates to tool-turrets for lathes, and has for its objects to produce a device of this character in which the tools may be readily inserted or removed, one in which the cutting plane of the tool may be readily adjusted relative to the work, and one which will carry a plurality of tools suitable for different kinds of work and be quickly operated to bring any desired tool into action, and has for its objects to combine these various functions in a device which will be simple of construction, efficient in operation, and inexpensive to manufacture.

The invention comprises the details of construction and combination of parts more fully hereinafter described.

In the accompanying drawings, Figure 1 is a top plan view showing my device applied to a lathe-rest and its relation to the work in the lathe. Fig. 2 is a side sectional elevation illustrating the internal mechanism of the turret and the manner of applying the same to the lathe-rest. Fig. 3 is a detail sectional view illustrating the locking-pin.

Referring to the drawings, 1 indicates the live-center, 2 the dead-center, and 3 the rest, of a lathe. These parts, which are conventionally shown herein, may be of any ordinary type and of any suitable or desired construction and material, inasmuch as they are entirely foreign to my invention.

4 indicates my improved tool-turret, composed of crucible steel, wrought-iron, or other suitable material and comprising a base or fixed member 5 and an upper or relatively movable member 6. The turret in plan is preferably shaped in the form of a triangle having squared or truncated ends 7, as this form admits of the head being moved close up to the side of the work or to the end faces of the live and dead centers of the lathe.

8 indicates three tool rests or sockets formed in the movable member of the turret, each comprising a hole bored into the body of the member parallel with the side faces thereof and at right angles to the truncated ends 7, at which point the sockets enter the body of the member, and 9 indicates three set-screws tapped vertically into the upper face of the turret, one over each of the tool-sockets, in position to engage and hold the tools therein. By this construction it will be seen that the tools may be readily inserted into or removed from the tool-sockets and that each of the sockets may hold a tool adapted for a different variety of work from the tools in the other sockets, so that after the work under treatment has been acted upon by one tool a different tool may be brought into operation thereon simply by rotating the turret on its axis in the manner to be hereinafter described.

The base or fixed member 5 of the turret is provided with an integral upwardly-projecting central core 10, which is cylindrical in form and externally screw-threaded, as at 11. This core when the parts are assembled enters a cylindrical internally-threaded socket 12, formed centrally in the upper movable member 6, and in practice the movable member may be adjusted toward and from the base member to vary the cutting plane of the tool with relation to the work by screwing the movable member toward or from the base, as will be readily understood. When the movable member has been operated to bring the tool to the proper relative height to the work, it may be fixed against further movement relative to the base by means of a key or pin 13, adapted to engage any one of a series of sockets 14, formed in the upper face of the base member. The locking-key 13 is slidingly mounted in a socket or channel 15, formed vertically through the movable member, and has its upper end bent angularly to engage over the upper face of the member and hold the key out of engagement with the underlying socket 14 during the operation of adjusting the movable member.

16 is a horizontal stop in the form of a screw which enters the side wall of the member, with its end projecting into the channel 15, and the key has its side wall cut away longitudinally to form a shoulder which will engage the stop when the pin is permitted to drop downward in the socket, the side wall of the member adjacent to the channel being also cut away, as at 17, a suitable distance to permit the free passage of the angular end of the key during the downward movement of the latter.

18 indicates a vertical shaft or spindle provided at its lower end with a suitable head 19, adapted for engagement in a recess-slot 20, formed in the lathe-rest, to permit the removable attachment of the spindle thereto. The spindle is cylindrical in cross-section, and the turret, which is mounted thereon, is provided with a central cylindrical bearing-hole to receive the spindle and permit the rotation of the turret thereon, as will be readily understood. The upper end of the shaft or spindle 18 is screw-threaded for the engagement of a similarly-threaded nut 21, which holds the turret upon the spindle. The movable member is provided at its upper face with a vertical sleeve which forms a bearing for the lower face of the nut, this sleeve being of a height equal to the distance which the set-screws project above the turret to prevent the nut interfering in any way with the engagement of a tool for operating the screws. It will be seen by this construction the turret may as a whole after the tools have been adjusted to the proper cutting plane, as above described, be freely rotated on the spindle 18 to bring any one of the tools carried by the turret into cutting position, and this without affecting the plane of adjustment.

The operation of the device is as follows: Supposing the work in the lathe to be of a nature which requires for its proper formation the employment of a side tool, boring-tool, and facing-tool, these tools will be insterted in the respective tool-sockets of the turret and secured in place by tightening the set-screws. The movable member is then adjusted by screwing it toward or from the base member to bring the tool to the proper plane relative to the work in the lathe, and the turret is rotated on the spindle to bring the first tool required—say, for instance, the side tool—into position to act on the work. After this tool has been operated sufficiently upon the work the turret will be rotated to bring the next tool—say the borer—into action and next in turn when required the facing-tool. In operating with these various tools or any tools such as are usually employed in machine-work the turret may, owing to its peculiar shape, be moved directly up against the work and in this position operate throughout the entire length of the work from end to end thereof without interference from the lathe-centers.

From the foregoing description it will be seen that I produce a device which will hold a number of tools ready set for action upon a single piece of work, that may be quickly adjusted to bring the tools to the proper relative height to the work, that may be readily operated to bring any of the desired tools into action, that will, owing to its peculiar shape, admit of the tools being brought close to the face of the work or moved from end to end thereof, and one that will admit of a tool being readily removed and sharpened in the midst of its operation upon the work without danger of disarrangement of its adjustment. In attaining these ends I do not limit or confine myself to the precise details herein shown and described, as various changes may be made therein without departing from the spirit or scope of my invention.

Having thus described my invention, what I claim is—

1. In a tool-turret for lathes, the combination with a fixed member, of a relatively movable member, means for holding a tool therein, one of said members having a core threaded into a socket in the other member, whereby the movable member is adapted for adjustment to change the cutting plane of the tool relative to the work, and means for locking the movable member in its adjusted position.

2. In a tool-turret for lathes, the combination with a fixed member provided with a series of sockets, of a movable member, means for holding a tool therein, one of said members having a core threaded into a socket in the other member, whereby the movable member is adapted for adjustment to change the cutting plane of the tool relative to the work, and a key carried by the movable member and adapted to engage any one of the series of sockets in the fixed member to lock the movable member in its adjusted position.

3. In a tool-turret for lathes, the combination with a fixed member, of a relatively movable member, means for holding a plurality of tools therein, one of said members having a core threaded into the socket of the other member, whereby the movable member is adapted for adjustment to change the cutting plane of the tools relative to the work, means for locking the movable member in its adjusted position, and a central shaft on which the turret, as a whole, rotates to bring any desired tool into action.

In testimony that I claim the foregoing as my own I have hereto affixed my signature in the presence of two witnesses.

OMAR LOYAL BRAINARD.

Witnesses:
CHAS. W. THOMPSON,
A. SCHAEFER.